US009153249B1

(12) United States Patent
Oenning et al.

(10) Patent No.: US 9,153,249 B1
(45) Date of Patent: Oct. 6, 2015

(54) CROSS-TALK MEASUREMENT IN ARRAY READER MAGNETIC RECORDING SYSTEM

(71) Applicant: LSI Corporation, San Jose, CA (US)

(72) Inventors: Travis Oenning, San Jose, CA (US); Ross S. Wilson, Menlo Park, CA (US); David W. Kelly, Eagan, MN (US); Jason S. Goldberg, Saint Paul, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/259,388

(22) Filed: Apr. 23, 2014

Related U.S. Application Data

(60) Provisional application No. 61/981,883, filed on Apr. 21, 2014.

(51) Int. Cl.
*G11B 5/02* (2006.01)
*G11B 5/035* (2006.01)

(52) U.S. Cl.
CPC ..................................... *G11B 5/035* (2013.01)

(58) Field of Classification Search
None
See application file for complete search history.

(56) References Cited

U.S. PATENT DOCUMENTS

| | | | | |
|---|---|---|---|---|
| 3,710,036 A * | 1/1973 | Kohtani | | 360/128 |
| 4,528,605 A * | 7/1985 | Hiraguri | | 360/77.14 |
| 4,550,345 A * | 10/1985 | Terada et al. | | 386/309 |
| 4,604,725 A * | 8/1986 | Davies et al. | | 360/72.2 |
| 4,677,504 A * | 6/1987 | Yamazaki et al. | | 360/77.16 |
| 5,057,945 A * | 10/1991 | Shimada et al. | | 360/22 |
| 5,122,916 A * | 6/1992 | Aranovsky | | 360/123.01 |
| 5,239,433 A * | 8/1993 | Watanabe | | 360/123.01 |
| 5,253,130 A * | 10/1993 | Kaaden et al. | | 360/77.15 |
| 5,450,382 A * | 9/1995 | Shiratori | | 369/13.41 |
| 5,870,239 A * | 2/1999 | Furuya | | 360/55 |
| 6,014,291 A * | 1/2000 | Watanabe et al. | | 360/121 |
| 6,075,664 A * | 6/2000 | Shimizu | | 360/46 |
| 7,839,592 B2 * | 11/2010 | Hokuto et al. | | 360/66 |
| 2004/0109253 A1 * | 6/2004 | Nishiyama et al. | | 360/46 |
| 2006/0119970 A1 * | 6/2006 | Hayashi et al. | | 360/68 |
| 2006/0187775 A1 * | 8/2006 | Yin et al. | | 369/44.28 |
| 2009/0213483 A1 * | 8/2009 | Matsui et al. | | 360/59 |
| 2010/0238777 A1 * | 9/2010 | Kondo et al. | | 369/53.28 |
| 2013/0286502 A1 | 10/2013 | Erden et al. | | |

FOREIGN PATENT DOCUMENTS

| | | | | | |
|---|---|---|---|---|---|
| JP | 63269306 A | * | 11/1988 | ............. | G11B 5/027 |
| JP | 03232103 A | * | 10/1991 | ............... | G11B 5/02 |

(Continued)

OTHER PUBLICATIONS

English Translation of Aikawa et al., JP 03232103 A, Oct. 1991.*

(Continued)

*Primary Examiner* — Peter Vincent Agustin
(74) *Attorney, Agent, or Firm* — Hamilton DeSanctis & Cha

(57) ABSTRACT

An apparatus for measuring cross-talk in an array reader magnetic storage system includes an array reader with multiple read heads operable to read data from a magnetic storage medium, a first preamplifier connected to a first read head, a second preamplifier connected to a second read head, and a cross-talk measurement circuit connected to the first preamplifier and to the second preamplifier, operable to measure cross-talk between a first signal from the first read head and a second signal from the second read head.

20 Claims, 5 Drawing Sheets

(56) References Cited

FOREIGN PATENT DOCUMENTS

JP           07057265 A  *  3/1995  ............... G11B 7/00
WO    WO 9638838 A2  *  12/1996  ............... G11B 5/02

OTHER PUBLICATIONS

Palmer et al. "Identification of Nonlinear Write Effects Using Pseudorandom Sequences," IEEE Transactions on Magnetics, vol. MAG-23, No. 5, pp. 2377-2379, Sep. 1987.

U.S. Appl. No. 14/158,739, Unpublished (filed Jan. 17, 2014) (George Mathew).
U.S. Appl. No. 14/055,886, Unpublished (filed Oct. 17, 2013) (Xiufeng Song).
U.S. Appl. No. 14/048,897, Unpublished (filed Oct. 8, 2013) (George Mathew).
U.S. Appl. No. 14/031,990, Unpublished (filed Sep. 19, 2013) (George Mathew).
U.S. Appl. No. 14/021,811, Unpublished (filed Sep. 9, 2013) (George Mathew).

* cited by examiner

CROSS-TALK MEASUREMENT IN ARRAY READER MAGNETIC RECORDING SYSTEM

CROSS REFERENCE TO RELATED APPLICATIONS

The present application claims priority to (is a non-provisional of) U.S. Pat. App. No. 61/981,883, entitled "Cross-Talk Measurement In Array Reader Magnetic Recording System", and filed Apr. 21, 2014 by Oenning et al, the entirety of which is incorporated herein by reference for all purposes.

FIELD OF THE INVENTION

Various embodiments of the present invention provide systems and methods for measuring cross-talk in an array reader magnetic recording system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. In an array reader magnetic recording system, the read/write head assembly includes an array of multiple read heads each positioned to read the target track.

SUMMARY

Various embodiments of the present invention provide systems and methods for measuring cross-talk in an array reader magnetic recording system.

In some embodiments, an apparatus for measuring cross-talk in an array reader magnetic storage system includes an array reader with multiple read heads operable to read data from a magnetic storage medium, a first preamplifier connected to a first read head, a second preamplifier connected to a second read head, and a cross-talk measurement circuit connected to the first preamplifier and to the second preamplifier, operable to measure cross-talk between a first signal from the first read head and a second signal from the second read head.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

A system, method and apparatus is disclosed herein for measuring and characterizing cross-talk in an array reader magnetic recording system, also referred to as a two dimensional magnetic recording system. The array reader magnetic recording system uses an array of read heads or magneto-resistive (MR) sensors to retrieve information from one or more data tracks on a storage medium, allowing for increased areal density as well as many system-level and manufacturing benefits. However, the performance of the system can be degraded by cross-talk (coupling) between signals. Dominant sources of cross-talk are from capacitive coupling at the read heads as well as the transmission line between the head and preamplifier, which in some embodiments is a flexible transmission line referred to herein as a flex on suspension. Due to the effect of cross-talk on performance, it is important to be able to measure and characterize the cross-talk in the system. The resulting measurement and characterization of the cross-talk can be used in any manner, such as, but not limited to, configuring a noise cancellation circuit, or identifying sub-optimal readers on a wafer during fabrication to be excluded from use. In some embodiments, the result of the measurement is based on the transfer function of the cross-talk between signals at the read heads and transmission lines between the read heads and preamplifiers. In some other embodiments, the result of the measurement is based on the transfer function of the cross-talk between signals at the write lines as well as at the read heads and transmission lines between the read heads and preamplifiers.

Several cross-talk measurement embodiments are disclosed herein to measure either or both the relative power of the cross-talk and/or the transfer function of the cross-talk, giving the shape of the frequency response for the cross-talk. During the measurement procedure, a signal is driven on one of the read heads while the other read heads remain un-driven. Signals can be driven on the read heads in any suitable manner, such as, but not limited to, selectively turning on the read bias current to only the desired read head as the array reader passes over a pseudo-random data pattern on the storage medium, or by positioning the read/write head assembly to avoid reading a data pattern and passing a write current through the desired head while measuring the response on other heads.

Figure 1:
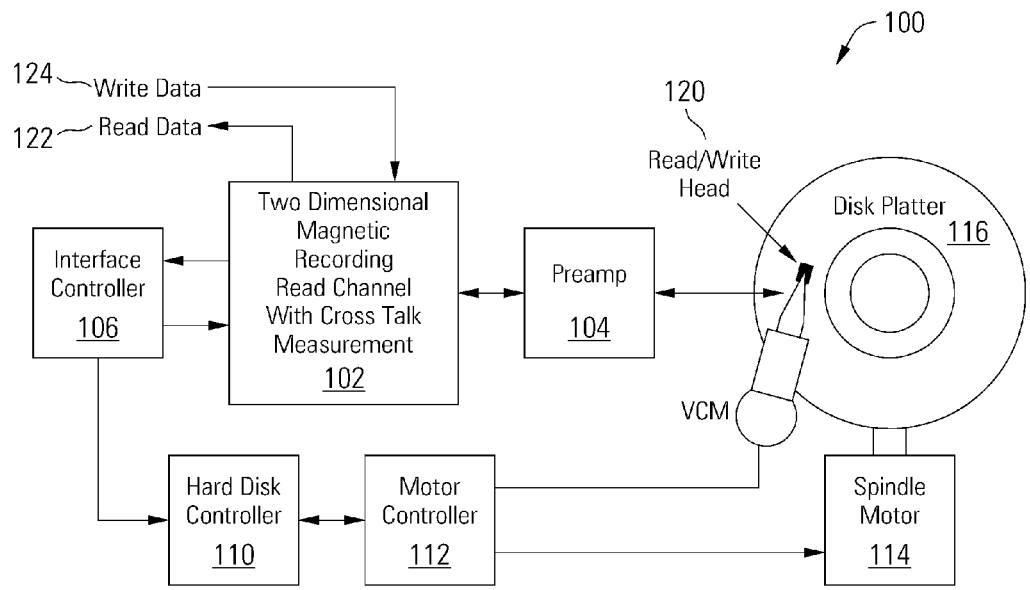
FIG. 1 depicts a storage system including an array reader magnetic recording read channel with cross-talk measurement in accordance with some embodiments of the present invention.

Turning to FIG. 1, a storage system 100 is disclosed which includes an array reader magnetic recording system read channel with cross-talk measurement 102 in accordance with some embodiments of the present invention. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. Read channel circuit 102 digitizes and decodes the received analog signal to recreate the information originally written to disk platter 116. This data is provided as read data 122 to a receiving circuit. The read channel circuit 102 also measures and characterizes cross-talk between signals from the multiple read heads. A write operation is substantially the opposite of the preceding read operation with write data 124 being provided to read channel circuit 102. This data is then encoded and written to disk platter 116. The cross-talk measurement can be implemented consistent with that disclosed below in relation to FIGS. 2-6. In some cases, the cross-talk measurement can be performed consistent with the flow diagrams disclosed below in relation to FIGS. 7-8.

It should be noted that in some embodiments storage system 100 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 100, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 100 is modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory may be used as a cache where it offers faster access time than that offered by disk platter 116. In such a case, the solid state memory may be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
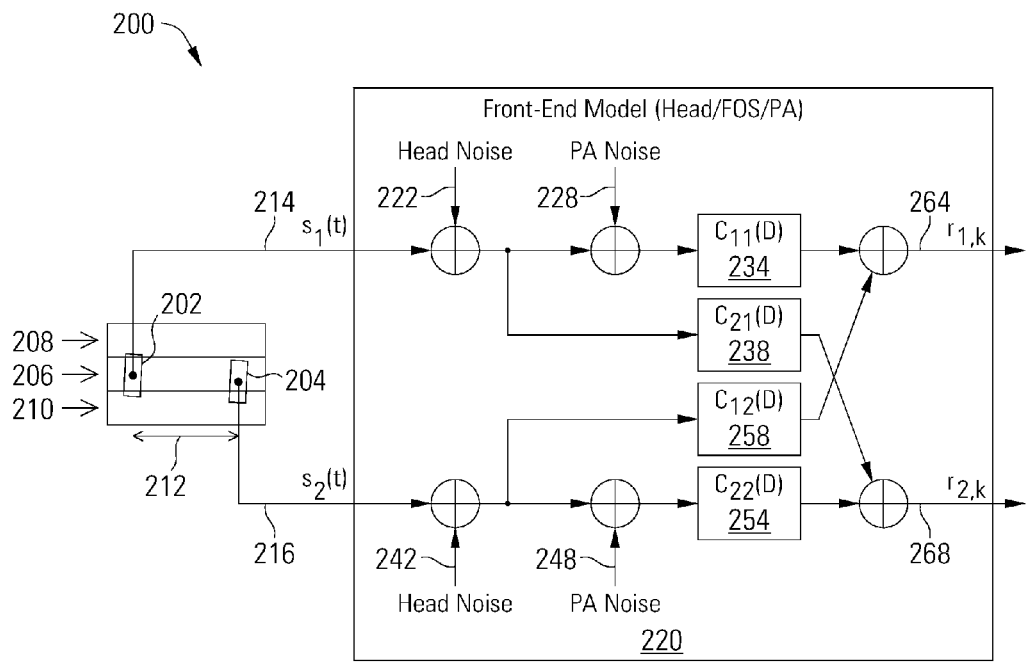
FIG. 2 is a block diagram of an array reader magnetic recording system showing the model with cross-talk of a front-end circuit including read heads, flex on suspension transmission line and preamplifier in accordance with some embodiments of the present invention.

Turning to FIG. 2, a block diagram 200 of an array reader magnetic recording system shows the model with cross-talk of a front-end circuit including read heads, flex on suspension transmission line and preamplifier in accordance with some embodiments of the present invention. An array reader or sensor includes multiple read heads such as, but not limited to, the two read heads 202, 204 shown in FIG. 2. The read heads 202, 204 are positioned over a target track 206 between side tracks 208, 210. In some embodiments, there is a down track separation 212 between the read heads 202, 204, causing an offset between the signals 214, 216 from the read heads 214, 216 which can be corrected in any suitable manner such as a variable delay circuit (not shown), aligning signals 214, 216.

Preamplifiers amplify the analog signals 214, 216 from read heads 202, 204, yielding amplified analog signals that are driven to the input of a read channel as received signals 264, 268. In some embodiments, the amplified analog signals are driven over a flexible transmission line or flex on suspension (FOS). The received signals $r_{1,k}$ 264, $r_{2,k}$ 268 can be processed or used in any suitable manner, such as, but not limited to, digitizing, detecting and decoding to recover the originally stored values.

Read-back analog signals $s_1(t)$ 214, $s_2(t)$ 216 may be, but are not limited to, minute analog electrical signals derived from read heads 202, 204 in a read/write head assembly that is disposed in relation to a storage medium. Based upon the disclosure provided herein, one of ordinary skill in the art will recognize a variety of sources from which analog signals 214, 216 may be derived. Read-back analog signals $s_1(t)$ 214, $s_2(t)$ 216 can be represented as a noisy linear super-position of a di-bit response, modeled as a convolution as shown in Equations 1 and 2 as follows:

$$s_1(t) = Sum_k \{a_k h_1(t-kT)\} + n_1(t) \quad \text{(Eq 1)}$$

$$s_2(t) = Sum_k \{a_k h_2(t-kT)\} + n_2(t) \quad \text{(Eq 2)}$$

where $a_k$ is +1 or −1, depending on whether the bit corresponds to a north magnet or south magnet stored on the storage medium, $h_i(t-kT)$ is the inter-symbol interference response that spreads the $a_k$ information across multiple bit cells, k is a bit index, T is a bit period, and $n_i(t)$ is the media noise.

The transfer functions $C_{11}(D)$ 234 and $C_{22}(D)$ 254 of the preamplifiers specify the frequency response of the preamplifiers. The transfer functions $C_{11}(D)$ 234 and $C_{22}(D)$ 254 of the preamplifiers are known in advance and can be obtained by modeling during the design process and/or by measurement. In many typical systems, the frequency response of the preamplifiers is designed to be as flat as possible as a function of frequency, although in practice the preamplifier frequency response often tends to fall off at high frequencies. However, the cross-talk transfer functions $C_{21}(D)$ 238 and $C_{12}(D)$ 258 are not known and can be measured and characterized as disclosed herein.

The cross-talk measurement and characterization disclosed herein yields either or both the relative power or frequency response shape of the cross-talk transfer functions $C_{21}(D)$ 238 and $C_{12}(D)$ 258, representing the frequency dependent cross-coupling between the signal paths for the read heads 202, 204. Although example embodiments with two read heads 202, 204 are shown, the cross-talk measurement and characterization is not limited to any particular number of heads in an array reader.

The capital D notation used herein for transfer function variables is used herein as a shorthand for a unit delay $Z^{-1}$ in a Z transform domain. Thus, a transfer function $C_{11}(D)$ 234 can be written as a polynomial in D. In the discrete time domain, the lowercase k notation refers to the index in baud rate samples, with one sample per bit. In the Z transform domain, the output of a transfer function (e.g., $C_{11}(D)$ 234) can be calculated by multiplying the polynomial by the input to the transfer function. In the discrete time domain, the output can be calculated by convolving the transfer function by the input to the transfer function.

The front-end model 220 of FIG. 2 also shows several sources of noise. Noise can be added to the signals 214, 216 in a number of manners, such as by head noise 222 and 242 and preamplifier noise 228, 248. Signals 214, 216 can also include noise from the storage medium. Other noise sources may exist, and the noise may be added to signals in different locations. For example, the preamplifier noise 228, 248 is shown to be added to the primary signal paths and not to the cross-talk signals, which is a simplification. However, for clarity, only some example noise sources are shown. By using a pseudo-random bit sequence to drive read heads during the cross-talk measurement and characterization, the effect of noise on the results is negligible in some embodiments.

As shown in the block diagram 200 and front end model 220, the received signal $r_{1,k}$ 264 is based on the analog signal $s_1(t)$ 214 convolved with the transfer function $C_{11}(D)$ 234 (the primary signal), and on the analog signal $s_2(t)$ 216 convolved with the cross-talk transfer function $C_{12}(D)$ 258 (the cross-talk signal), plus noise terms. Similarly, the received signal $r_{2,k}$ 268 is based on the analog signal $s_2(t)$ 216 convolved with the transfer function $C_{22}(D)$ 254 (the primary signal), and on the analog signal $s_1(t)$ 214 convolved with the cross-talk transfer function $C_{21}(D)$ 238 (the cross-talk signal), plus noise terms. Notably, when a read head is turned off or de-biased, the signal $s_1(t)$ or signal $s_2(t)$ disappears, although the head noise and preamplifier noise remain in the received signals $r_{1,k}$ 264, $r_{2,k}$ 268. De-biasing the head, besides squelching its internal signal source, leaves all other front-end and interconnect properties intact allowing for accurate measurement. Setting the bias current to zero on a magneto-resistive (MR) sensor (i.e., "de-biasing" the sensor) effectively turns that sensor off so that any signal on the associated read-back line will be due only to crosstalk (and noise). In some embodiments, the measure of cross-talk is performed by measuring the relative signal powers of the signal line with biasing compared to the others without biasing.

Figure 3:
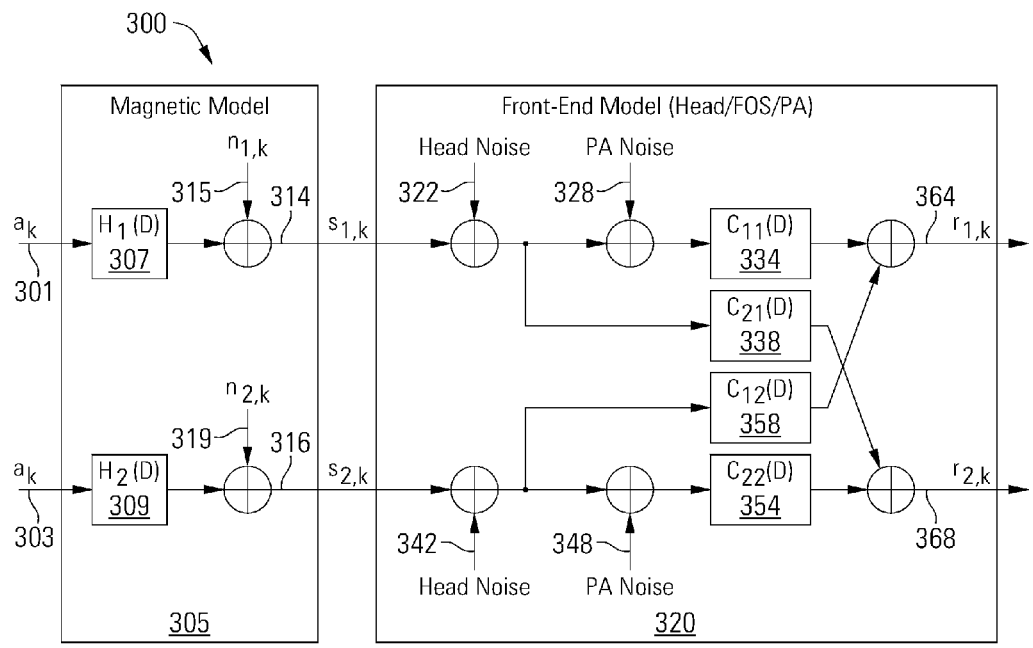
FIG. 3 is a block diagram of an array reader magnetic recording system showing the read head magnetic model and the model with cross-talk of a front-end circuit including flex on suspension transmission line and preamplifier in accordance with some embodiments of the present invention.

Turning to FIG. 3, a block diagram 300 of an array reader magnetic recording system shows the read head magnetic model 305 and the model 320 with cross-talk of a front-end circuit including flex on suspension transmission line and preamplifier in accordance with some embodiments of the present invention. The front-end model 320 shows the derivation of received signals $r_{1,k}$ 364, $r_{2,k}$ 368 based on signals $s_{1,k}$ 314, $s_{2,k}$ 316, convolved with transfer functions $C_{11}(D)$ 334, $C_{21}(D)$ 338, $C_{12}(D)$ 358, $C_{22}(D)$ 354 and with head noise 322, 342 and preamplifier noise 328, 348 included.

The diagram 300 also shows the read head magnetic model 305, in which the $a_k$ signals 301, 303 are convolved with inter-symbol interference transfer functions $H_1(D)$ 307, $H_2(D)$ 309, respectively, and in which media noise or noise from other sources $n_{1,k}$ 315, $n_{2,k}$ 319 is added to yield signals $s_{1,k}$ 314, $s_{2,k}$ 316. Again, in $a_k$ signals 301, 303, each bit has the value +1 or −1, depending on whether the bit corresponds to a north magnet or south magnet stored on the storage medium.

The received signal $r_{1,k}$ 364 is thus based on signal $s_{1,k}$ 314 as a pass-through signal and on signal $s_{2,k}$ 316 due to cross-talk as shown in FIG. 3 and as expressed in the following Equation:

$$r_{1,k} = C_{11}(D)H_1(D)a_k + C_{12}(D)H_2(D)a_k + C_{11}(D)(n_{1,k} + \text{head noise } 322 + \text{preamplifier noise } 328) + C_{12}(D)(n_{2,k} + \text{head noise } 342) \quad \text{(Eq 3)}$$

Similarly, the received signal $r_{2,k}$ 368 is thus based on signal $s_{2,k}$ 316 as a pass-through signal and on signal $s_{1,k}$ 314 due to cross-talk as shown in FIG. 3 and as expressed in the following Equation:

$$r_{2,k} = C_{22}(D)H_2(D)a_k + C_{21}(D)H_1(D)a_k + C_{22}(D)(n_{2,k} + \text{head noise } 342 + \text{preamplifier noise } 348) + C_{21}(D)(n_{1,k} + \text{head noise } 322) \quad \text{(Eq 4)}$$

where the types and locations of noise sources are approximated herein.

The models and Equations can be simplified by several conditions. In some embodiments, $a_k$ is a pseudo-random bit sequence, either constructed purposefully or by using a long enough block of randomly generated data that there is substantially no correlation at different lags. As a result, the pseudo-random bit sequence $a_k$ convolved with a time-reversed version of the pseudo-random bit sequence $a_{-k}$ yields $\delta_k$, where $\delta_k=1$ for k=0, and where $\delta_k=0$ for k≠0. In other words, $a_k$ and $a_{-k}$ are only correlated when they are aligned, and at any other time lag there will be negligible correlation between them. This allows $a_k$ to be cancelled out in the cross-talk measurement. Furthermore, it can be assumed that $C_{ii}(D)H_i(D) \approx H_i(D)$, either due to the choice of preamplifier settings which give a preamplifier transfer function $C_{ii}(D)$ of about 1 across the relevant frequency range, or due to the fact that the preamplifier transfer function $C_{ii}(D)$ has relatively little effect on $H_i(D)$ because the frequency response of $H_i(D)$ drops off at a lower frequency than $C_{ii}(D)$ and therefore dominates. Finally, the noise terms tend to average out in the cross-talk measurement and can be treated as negligible in some embodiments.

Figure 4:
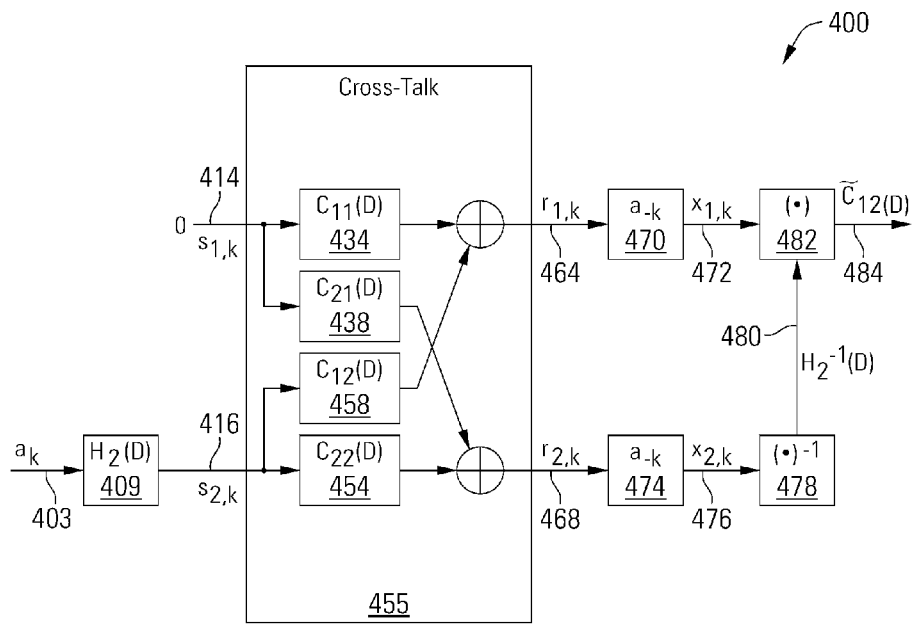
FIG. 4 is a block diagram illustrating characterization of cross-talk from a second read head to a first read head in an array reader magnetic recording system in accordance with some embodiments of the present invention.

Turning to FIG. 4, a block diagram 400 illustrates the characterization of cross-talk from a second read head (e.g., 204) to a first read head (e.g., 202) in an array reader magnetic recording system in accordance with some embodiments of the present invention. To measure or to characterize the cross-talk from a particular read head, only that read head in the array reader is driven. In one embodiment with just two read heads, to measure the cross-talk from the second read head to the first read head, the first read head is de-biased, resulting in an input signal $s_{1,k}$ 414 of 0. (Again, noise tends to average out in the cross-talk measurement and is therefore treated as negligible and omitted from the calculations in some embodiments.) The second read head is biased, yielding signal $a_k$ 403. When a read head is biased, a bias current is passed through it, and when the read head passes over the magnetic storage medium, the current flow through the resistive read head changes in response to the magnetic flux, resulting in a varying output voltage. When the first read head is de-biased and the second head is biased, and the array reader passes over a pseudo-random bit sequence $a_k$, the input signal $s_{1,k}$ 414 is 0 and the input signal $s_{2,k}$ 416 is based on the pseudo-random bit sequence $a_k$ 403 and the inter-symbol interference transfer function $H_2(D)$ 409, or $s_{2,k} = H_2(D)a_k$.

The received signal $r_{1,k}$ 464 is based on the pseudo-random bit sequence $a_k$ 403, the inter-symbol interference transfer function $H_2(D)$ 409, and the cross-talk preamplifier transfer function $C_{12}(D)$ 458. Because the first read head is de-biased, the received signal $r_{1,k}$ 464 is not based on input signal $s_{1,k}$ 414 or on the pass-through preamplifier transfer function $C_{11}(D)$ 434. The received signal $r_{2,k}$ 468 is based on the pseudo-random bit sequence $a_k$ 403, the inter-symbol interference transfer function $H_2(D)$ 409, and the pass-through preamplifier transfer function $C_{22}(D)$ 454. Because the first read head is de-biased, the received signal $r_{2,k}$ 468 is not based on input signal $s_{1,k}$ 414 or on the cross-talk preamplifier transfer function $C_{21}(D)$ 438. This is expressed in the following Equations:

$$r_{1,k} = C_{12}(D)H_2(D)a_k \qquad (Eq\ 5)$$

$$r_{2,k} = C_{22}(D)H_2(D)a_k \qquad (Eq\ 6)$$

The received signals $r_{1,k}$ 464, $r_{2,k}$ 468 are convolved with time-reversed pseudo-random bit sequence $a_{-k}$ 470, 474, yielding signals $x_{1,k}$ 472 and $x_{2,k}$ 476. Because $a_k$ is a pseudo-random bit sequence for which $$a_k * a_{-k} = \begin{cases} 1, & k = 0 \\ 0, & k \neq 0 \end{cases},$$

the convolution with time-reversed pseudo-random bit sequence $a_{-k}$ 470, 474 results in the cancellation of the $a_k$ terms in signals $x_{1,k}$ 472 and $x_{2,k}$ 476, and because $C_{ii}(D)H_i(D) \approx H_i(D)$, the $C_{22}(D)$ transfer function is dropped in signal $x_{2,k}$ 476 as follows:

$$x_{1,k} \approx C_{12}(D)H_2(D) \qquad (Eq\ 7)$$

$$x_{2,k} \approx H_2(D) \qquad (Eq\ 8)$$

The signal $X_{2,k}$ 476 is inverted 478, yielding the inverse inter-symbol transfer function $H_2^{-1}(D)$ 480. The signal $x_{1,k}$ 472 is then convolved with the inverse inter-symbol transfer function $H_2^{-1}(D)$ 480, yielding the estimation of the cross-talk transfer function $\tilde{C}_{12}(D)$ 484 being measured.

Figure 5:
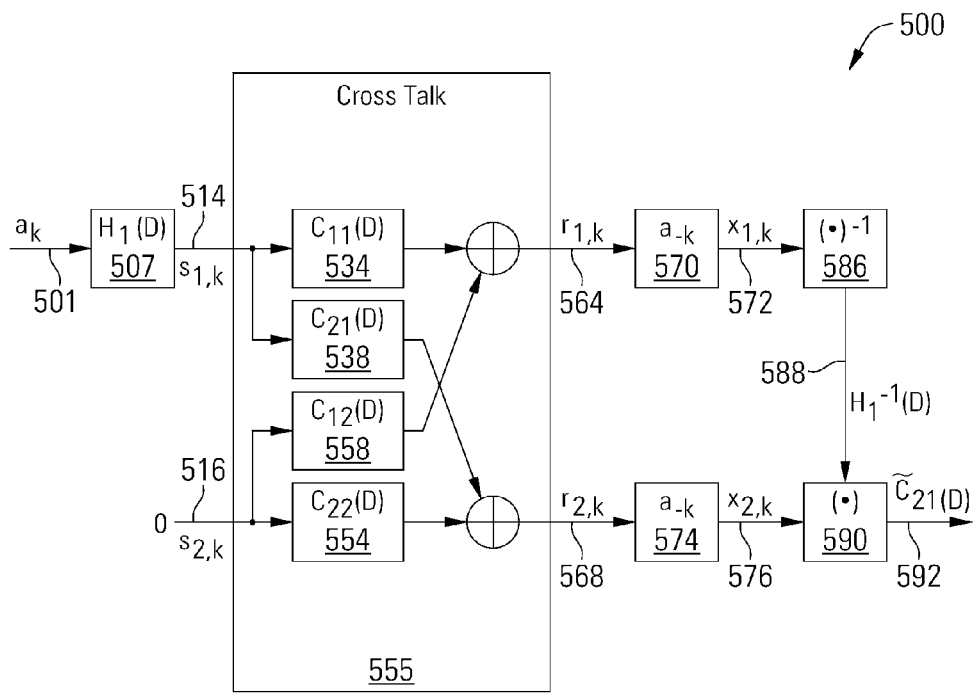
FIG. 5 is a block diagram illustrating characterization of cross-talk from a first read head to a second read head in an array reader magnetic recording system in accordance with some embodiments of the present invention.

Turning to FIG. 5, a block diagram 500 illustrates the characterization of cross-talk from a first read head (e.g., 202) to a second read head (e.g., 204) in an array reader magnetic recording system in accordance with some embodiments of the present invention. To measure or to characterize the cross-talk from a particular read head, only that read head in the array reader is driven. In one embodiment with just two read heads, to measure the cross-talk from the first read head to the second read head, the second read head is de-biased, resulting in an input signal $s_{2,k}$ 516 of 0. (Again, noise tends to average out in the cross-talk measurement and is therefore treated as negligible and omitted from the calculations in some embodiments.) The first read head is biased, yielding signal $a_k$ 501. When the second read head is de-biased and the first head is biased, and the array reader passes over a pseudo-random bit sequence $a_k$, the input signal $s_{2,k}$ 516 is 0 and the input signal $s_{1,k}$ 514 is based on the pseudo-random bit sequence $a_k$ 501 and the inter-symbol interference transfer function $H_1(D)$ 507, or $s_{1,k} = (D)a_k$.

The received signal $r_{2,k}$ 568 is based on the pseudo-random bit sequence $a_k$ 501, the inter-symbol interference transfer function $H_1(D)$ 507, and the cross-talk preamplifier transfer function $C_{21}(D)$ 538. Because the second read head is de-biased, the received signal $r_{2,k}$ 568 is not based on input signal $S_{2,k}$ 516 or on the pass-through preamplifier transfer function $C_{22}(D)$ 554. The received signal $r_{1,k}$ 564 is based on the pseudo-random bit sequence $a_k$ 501, the inter-symbol interference transfer function $H_1(D)$ 507, and the pass-through preamplifier transfer function $C_{11}(D)$ 534. Because the second read head is de-biased, the received signal $r_{1,k}$ 564 is not based on input signal $s_{2,k}$ 516 or on the cross-talk preamplifier transfer function $C_{12}(D)$ 558. This is expressed in the following Equations:

$$r_{1,k} = C_{11}(D)H_1(D)a_k \qquad (Eq\ 9)$$

$$r_{2,k} = C_{21}(D)H_1(D)a_k \qquad (Eq\ 10)$$

The received signals $r_{1,k}$ 564, $r_{2,k}$ 568 are convolved with time-reversed pseudo-random bit sequence $a_{-k}$ 570, 574, yielding signals $x_{1,k}$ 572 and $x_{2,k}$ 576. Because $a_k$ is a pseudo-random bit sequence for which $$a_k * a_{-k} = \begin{cases} 1, & k = 0 \\ 0, & k \neq 0 \end{cases},$$

the convolution with time-reversed pseudo-random bit sequence $a_{-k}$ 570, 574 results in the cancellation of the $a_k$ terms in signals $x_{1,k}$ 572 and $x_{2,k}$ 576, and because $C_{ii}(D)H_i(D) \approx H_i(D)$, the $C_{11}(D)$ transfer function is dropped in signal $x_{1,k}$ 572 as follows:

$$x_{1,k} \approx H_1(D) \qquad (Eq\ 11)$$

$$x_{2,k} \approx C_{21}(D)H_1(D) \qquad (Eq\ 12)$$

The signal $x_{1,k}$ 572 is inverted 586, yielding the inverse inter-symbol transfer function $H_1^{-1}(D)$ 588. The signal $x_{2,k}$ 576 is then convolved with the inverse inter-symbol transfer function $H_1^{-1}(D)$ 588, yielding the estimation of the cross-talk transfer function $\tilde{C}_{21}(D)$ 592 being measured.

The cross-talk measurement is not limited to use with an array reader with only two read heads. In the two-head example above, the coupling from read head 1 to read head 2 is considered, as well as the coupling from read head 2 to read head 1. In an array reader magnetic recording system with three read heads, each of the three possible pairings would be considered in each direction. For example, the coupling from read head 1 to read head 2 and from read head 1 to read head 3 would be measured by biasing read head 1 and de-biasing read heads 2 and 3 and proceeding with the measurement disclosed above on the signal paths from read heads 2 and 3. The coupling from read head 2 to read head 1 and from read head 2 to read head 3 would be measured by biasing read head 2 and de-biasing read heads 1 and 3 and proceeding with the measurement disclosed above on the signal paths from read heads 1 and 3, etc. The cross-talk measurement can be extended in the same manner to be performed with four or more read heads in an array reader.

The selective driving of the read heads, enabling one while the others in the array are disabled, can be performed in any suitable manner. One of the heads can be biased while the others are de-biased, effectively turning off all sensors so that any signal on the read-back lines associated with the de-biased sensors is due only to cross-talk (and noise). In that configuration, the array reader is passed over a pseudo-random bit sequence on the storage medium as disclosed above while the cross-talk is measured as disclosed above.

In some other embodiments, a signal is induced in one of the read heads using, for example, the write lines in the read/write head assembly. In these embodiments, the array reader is positioned to avoid receiving a signal from the storage medium, for example by positioning the array reader over an erased area of the storage medium, or by positioning the array reader on the load/unload ramp, such that the array reader does not receive transitioning data from the storage medium. The write lines corresponding to one of the read heads are driven with a pseudo-random bit sequence, while the cross-talk is measured as disclosed above. In these embodiments, a different transfer function is measured or characterized, which includes the transfer function of the write lines.

The transfer functions of the cross-talk can be measured in several different ways. The relative signal power of the signal line from the driven read head compared to the signal power from the other read heads can be measured, resulting in an estimate of the relative power or energy in the cross-talk. The shape of the transfer function can also be characterized, giving the frequency response of the cross-talk.

Figure 6:
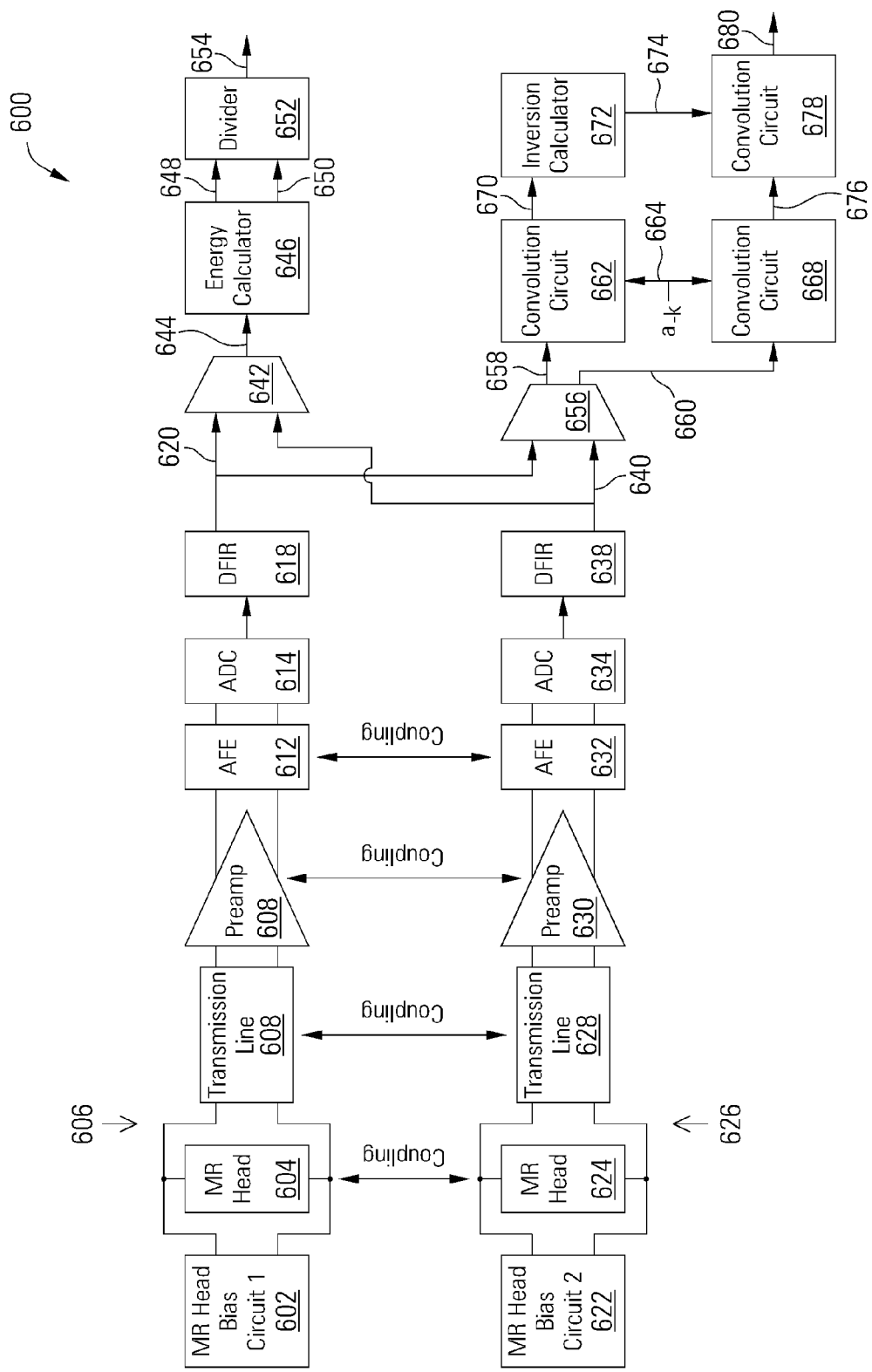
FIG. 6 is a block diagram of an array reader magnetic recording system with cross-talk measurement circuits in accordance with some embodiments of the present invention.

Turning to FIG. 6, a block diagram of an array reader magnetic recording system 600 with cross-talk measurement circuits is shown in accordance with some embodiments of the present invention. The array reader magnetic recording system 600 includes two magneto-resistive sensors or read heads 604, 624, although other numbers of read heads can be used. Bias circuits 602, 622 provide read currents to read heads 604, 624 that can be enabled or disabled to bias or de-bias the read heads 604, 624. The signals 606, 626 from the read heads 604, 624 are coupled to preamplifier circuits 608, 630 by transmission lines 608, 628, which in some embodiments comprise flex on suspension transmission lines. (In some embodiments, transmission lines 608, 628 share a common conductor.) Preamplifier circuits 608, 628 amplify the minute analog signals from the read heads 604, 624, yielding amplified analog signals.

Preamplifier circuits 608, 628 can be any circuits known in the art that are capable of amplifying analog signals. Based upon the disclosure provided herein, one of ordinary skill in the art will recognize a variety of amplifier circuits that may be used in relation to different embodiments of the present invention.

Analog front end circuits 612, 632 receive and process the amplified analog signals from preamplifier circuits 608, 628, providing processed analog signals to analog to digital converters 614, 634. Analog front end circuits 612, 632 may include, but are not limited to, an analog filter and an amplifier circuit as are known in the art. Based upon the disclosure provided herein, one of ordinary skill in the art will recognize a variety of circuitry that may be included as part of analog front end circuits 612, 632.

Analog to digital converters 614, 634 convert processed analog signals into corresponding series of digital samples. Analog to digital converters 614, 634 can be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention.

Digital samples from analog to digital converters 614, 634 are provided to equalizer circuits 618, 638. Equalizer circuits 618, 638 apply an equalization algorithm to the digital samples to yield equalized outputs 620, 640. In some embodiments of the present invention, equalizer circuits 618, 638 are digital finite impulse response filter circuits as are known in the art. Based upon the disclosure provided herein, one of ordinary skill in the art will recognize a variety of equalizer circuits that can be used in relation to different embodiments of the present invention.

Cross-coupling between the signal paths for each of the read heads 604, 624 can occur at various points based on the design and layout of the system, such as, but not limited to, between read heads 604, 624, transmission lines 608, 628, preamplifiers 608, 630, analog front ends 612, 632, etc.

The relative power or energy of the cross-talk transfer functions can be measured by an energy calculator circuit 646 and divider circuit 652. The energy calculator circuit 646 can be any circuit capable of calculating the energy in a series of digital samples, such as, but not limited to, circuits for calculating the sum of the squares of the digital sample values, or the mean of the squares of the digital sample values, etc. Based upon the disclosure provided herein, one of ordinary skill in the art will recognize a variety of energy calculator circuits that can be used in relation to different embodiments of the present invention. The divider circuit 652 can be any circuit capable of calculating the relationship or ratio between energy measurements from the energy calculator circuit 646 at different times of the cross-talk measurement process, such as, but not limited to, a divider circuit, with a memory to retain the energy measurements for multiple stages either in or between either the energy calculator circuit 646 or the divider circuit 652. Based upon the disclosure provided herein, one of ordinary skill in the art will recognize a variety of divider circuits that can be used in relation to different embodiments of the present invention. A switch or multiplexer 642 can be used to route equalized signals 620, 640 to the energy calculator circuit 646 to configure the direction of cross-talk being measured.

As an example of the measurement of relative energy of the cross-talk transfer functions in the two-head embodiment of FIG. 6, the head bias circuit 602 is turned on to bias read head 604, and the head bias circuit 622 is turned off to de-bias read head 624. The array reader is passed over a bit sequence on the storage medium, and the resulting signals are processed as disclosed above to yield equalized output 620, which is based on the pass-through signal from the read head 604. The multiplexer 642 is configured to connect the equalized output 620 to the energy calculator 646, which calculates the energy 648 in the equalized output 620. The head bias circuit 602 is then turned off to de-bias read head 604, and the head bias circuit 622 is turned on to bias read head 624. The array reader is passed over the bit sequence on the storage medium, and the resulting signals are processed as disclosed above to yield equalized output 620, which is based on the cross-talk from the signal from the read head 624. The multiplexer 642 remains configured to connect the equalized output 620 to the energy calculator 646, which calculates the energy 650 in the equalized output 620. The divider circuit 652 calculates the ratio between the cross-talk energy 650 and the pass-through energy 648, yielding the relative amount 654 of cross-talk from the signal path for read head 624 to the signal path for read head 604. The cross-talk in the other direction from the signal path for read head 604 to the signal path for read head 624 can be calculated by configuring the multiplexer 642 to connect the equalized output 640 to the energy calculator circuit 646 and running the process with only read head 624 biased, then with only read head 604 biased.

The shape of the cross-talk transfer function 680 can also be characterized in the array reader magnetic recording system 600, giving the frequency response of the cross-talk. Convolution circuits 662, 668 convolve their inputs 658, 660 (also referred to herein as $r_{1,k}$, $r_{2,k}$) with the time-reversed version of the pseudo-random bit sequence $a_{-k}$ 664, yielding outputs 670, 676 (also referred to herein as $x_{1,k}$, $x_{2,k}$) according to Equations 11-12. The convolution circuits 662, 668 can be any circuits suitable for performing the convolution with the time-reversed version of the pseudo-random bit sequence $a_{-k}$ 664, such as, but not limited to, matched filters. Based upon the disclosure provided herein, one of ordinary skill in the art will recognize a variety of convolution circuits that can be used in relation to different embodiments of the present invention.

An inversion calculator 672 calculates the inverse of the transfer function at output 670, yielding the inverse transfer function 674. For example, if output 670 of convolution circuit 662 is inter-symbol interference transfer function $H_1(D)$, the inversion calculator 672 yields the inverse inter-symbol interference transfer function $H_1^{-1}(D)$ 674. The inversion calculator 672 can be any circuit suitable for computing a function inversion, such as, but not limited to an equalizer or adaptive filter adapted using a time-domain least squares method, frequency domain deconvolution method or any other suitable method. Based upon the disclosure provided herein, one of ordinary skill in the art will recognize a variety of circuits for computing a function inversion that can be used in relation to different embodiments of the present invention.

Convolution circuit 678 performs a time domain convolution, convolving the inverse inter-symbol transfer function $H_1^{-1}(D)$ 674 with the output 676 of convolution circuit 668 (signal $x_{1,k}$ or $x_{2,k}$), yielding the estimation of the cross-talk transfer function being measured ($\tilde{C}_{21}(D)$ or $\tilde{C}_{12}(D)$). Convolution circuit 678 can be any circuit for performing a time domain convolution. Based upon the disclosure provided herein, one of ordinary skill in the art will recognize a variety of time domain convolution circuits that can be used in relation to different embodiments of the present invention.

Switch or multiplexer 656 either routes the equalized output 620 to convolution circuit 662 and equalized output 640 to convolution circuit 668, or equalized output 620 to convolution circuit 668 and equalized output 640 to convolution circuit 662, thereby selecting which direction of cross-talk is being measured. When equalized output 620 is connected to convolution circuit 662 and equalized output 640 is connected to convolution circuit 668, bias circuit 602 biases read head 604 and bias circuit 622 is turned off to de-bias read head 624. When equalized output 620 is connected to convolution circuit 668 and equalized output 640 is connected to convolution circuit 662, bias circuit 602 is turned off to de-bias read head 604 and bias circuit 622 is turned on to bias read head 624.

Figure 7:
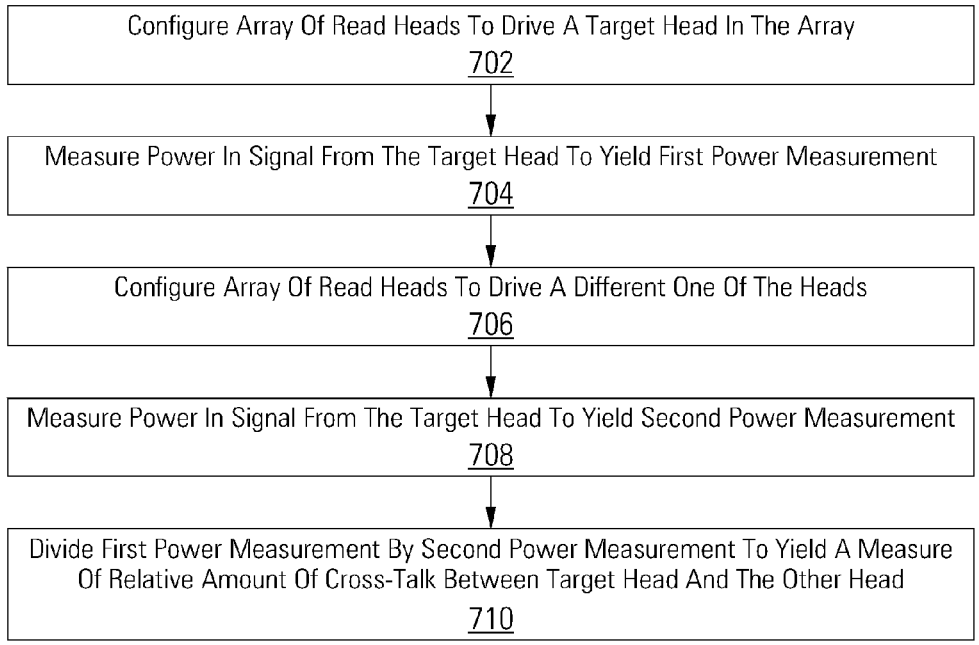
FIG. 7 is a flow diagram showing a method for measuring the relative amount of cross-talk in an array reader magnetic recording system in accordance with some embodiments of the present invention.

Turning to FIG. 7, a flow diagram 700 shows a method for measuring the relative amount of cross-talk in an array reader magnetic recording system in accordance with some embodiments of the present invention. Following flow diagram 700, an array of read heads is configured to drive a target head in the array. (Block 702) In some embodiments, one of the read heads is biased and the remainder of the read heads are de-biased, while the array of read heads is passed over a pseudo-random bit sequence on a storage medium. In some other embodiments, the array of read heads is positioned on the load/unload ramp or positioned over an erased portion of the storage medium, and one of the write lines is driven. The power in the signal from the target head is measured to yield a first power measurement. (Block 704) This measures the pass-through signal power. The array of read heads is then configured to drive a different one of the heads. (Block 706) The power in the signal from the target again measured to yield a second power measurement. (Block 708) This measures the cross-talk signal power. The first power measurement and the second power measurement are divided, yielding a ratio as a measure of the relative amount of cross-talk between the signal path for the target head and the signal path for the other head. (Block 710)

Figure 8:
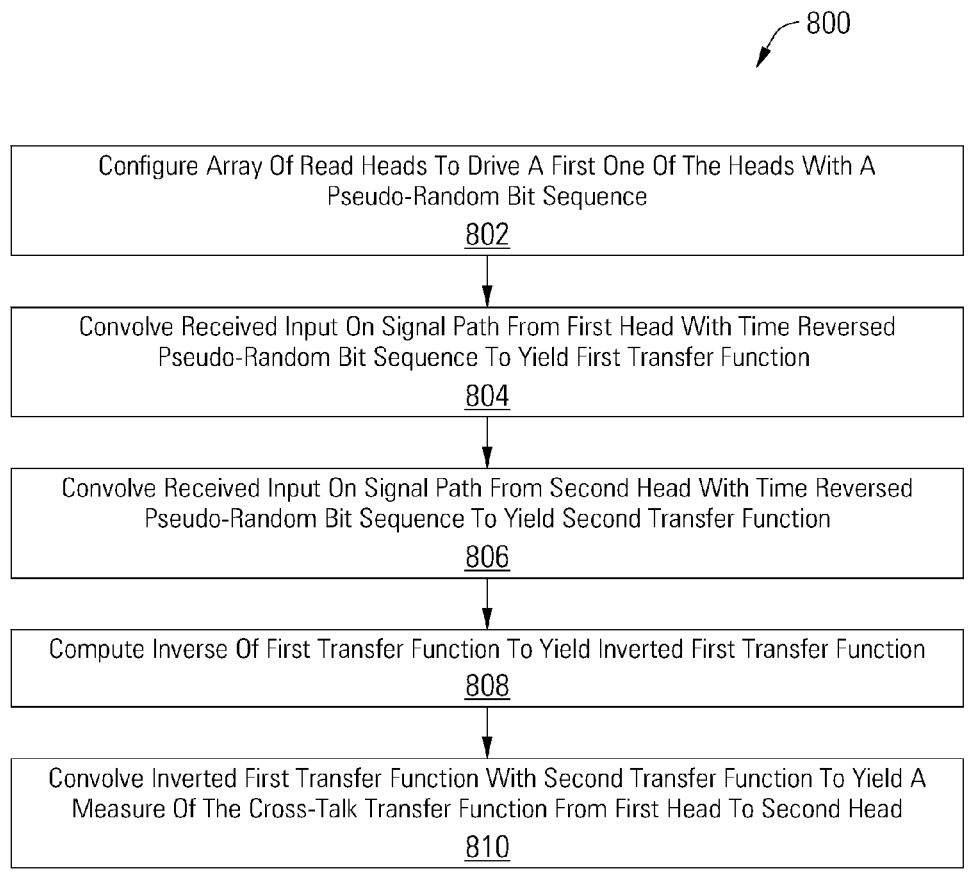
FIG. 8 is a flow diagram showing a method for measuring the cross-talk transfer function in an array reader magnetic recording system in accordance with some embodiments of the present invention.

Turning to FIG. 8, a flow diagram 800 shows a method for measuring the cross-talk transfer function in an array reader magnetic recording system in accordance with some embodiments of the present invention. Following flow diagram 800, an array of read heads is configured to drive a first one of the heads with a pseudo-random bit sequence. (Block 802) In some embodiments, one of the read heads is biased and the remainder of the read heads are de-biased, while the array of read heads is passed over a pseudo-random bit sequence on a storage medium. In some other embodiments, the array of read heads is positioned on the load/unload ramp or positioned over an erased portion of the storage medium, and one of the write lines is driven. The received input on the signal path from the first read head is convolved with a time-reversed or mirrored version of the pseudo-random bit sequence to yield a first transfer function. (Block 804) The received input on the signal path from the second read head is convolved with a time-reversed or mirrored version of the pseudo-random bit sequence to yield a second transfer function. (Block 806) The inverse of the first transfer function is computed to yield the inverse of the first transfer function. (Block 808) The inverse of the first transfer function is convolved with the second transfer function to yield a measure of the cross-talk transfer function from the first read head to the second read head. (Block 810)

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel adaptive combination of cross-talk measurement and characterization in an array reader magnetic recording system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus comprising:
an array reader comprising a plurality of read heads operable to read data from a magnetic storage medium;
a first preamplifier connected to a first read head in the plurality of read heads;
a second preamplifier connected to a second read head in the plurality of read heads; and
a cross-talk measurement circuit connected to the first preamplifier and to the second preamplifier, operable to measure cross-talk between a first signal from the first read head and a second signal from the second read head based on the first signal and on the second signal while one of the read heads is driven and a remainder of the plurality of read heads in the array reader are not driven.

2. The apparatus of claim 1, wherein the cross-talk measurement circuit is operable to measure a relative power of the cross-talk.

3. The apparatus of claim 2, wherein the cross-talk measurement circuit comprises an energy calculator circuit operable to calculate an energy of the first signal, and a divider circuit operable to divide a plurality of energy calculations from the energy calculator circuit to yield a measurement of relative cross-talk energy.

4. The apparatus of claim 3, wherein the cross-talk measurement circuit comprises an energy calculator circuit operable to calculate a first energy of the first signal when the first read head is driven and the second read head is not driven, and to calculate a second energy of the first signal when the second read head is driven and the first read head is not driven.

5. The apparatus of claim 1, wherein the cross-talk measurement circuit is operable to characterize a cross-talk transfer function.

6. The apparatus of claim 1, wherein the cross-talk measurement circuit comprises at least one convolution circuit operable to convolve the first signal with a time-reversed version of the data from the magnetic storage medium.

7. The apparatus of claim 1, wherein the cross-talk measurement circuit comprises at least one inversion calculator operable to compute an inverse of a transfer function.

8. The apparatus of claim 1, wherein the cross-talk measurement circuit comprises:
a first convolution circuit operable to convolve the first signal with a time-reversed version of the data from the magnetic storage medium;
an inversion calculator connected to the first convolution circuit operable to compute an inverse of a transfer function based on an output of the first convolution circuit;
a second convolution circuit operable to convolve the second signal with the time-reversed version of the data from the magnetic storage medium; and
a third convolution circuit operable to convolve an output of the inversion calculator with an output of the second convolution circuit to yield a cross-talk transfer function.

9. The apparatus of claim 1, further comprising a first analog front end circuit connected to the first preamplifier and a second analog front end circuit connected to the second preamplifier, wherein the cross-talk measured by the cross-talk measurement circuit includes cross-talk between the first analog front end circuit and the second analog front end circuit.

10. The apparatus of claim 1, further comprising a flexible transmission line between the array reader and the preamplifiers, wherein the cross-talk measured by the cross-talk measurement circuit includes cross-talk between conductors in the flexible transmission line.

11. The apparatus of claim 1, further comprising a plurality of bias circuits operable to provide read currents to the plurality of read heads, wherein only one of the plurality of read heads at a time is biased when the cross-talk measurement circuit measures the cross-talk.

12. The apparatus of claim 1, wherein each of the plurality of read heads comprises a write line, wherein one of the plurality of read heads at a time is driven by the corresponding write line when the cross-talk measurement circuit measures the cross-talk.

13. A method for measuring cross-talk in an array reader magnetic recording system, comprising:
driving a first read head in a plurality of read heads in an array reader while a remainder of the plurality of read heads in the array reader are not driven;
reading an analog signal from the array reader;
amplifying the analog signal;
digitizing the amplified analog signal to yield digital samples; and
calculating a cross-talk between the plurality of read heads based at least in part on the digital samples.

14. The method of claim 13, wherein driving the first read head comprises biasing the first read head with a read current and passing the array reader over a pseudo-random bit sequence on a magnetic storage medium, wherein the remainder of the plurality of read heads in the array reader are not driven by bias currents.

15. The method of claim 13, wherein driving the first read head comprises writing data to a write line in the first read head, wherein the remainder of the plurality of read heads in the array reader are not driven by associated write lines.

16. The method of claim 15, wherein the array reader is positioned to prevent receiving transitioning data from a magnetic storage medium during the reading.

17. The method of claim 13, wherein the calculating comprises:
measuring a first energy in the digital samples with the first read head being driven;
driving a second read head in the plurality of read heads while a remainder of the plurality of read heads in the array reader are not driven, including the first read head;
measuring a second energy in the digital samples with the second read head being driven; and
computing a ratio between the first energy and the second energy.

18. The method of claim 13, wherein driving the first read head comprises reading a pseudo-random bit sequence from a magnetic storage medium, wherein reading an analog signal from the array reader comprises reading a first analog signal from the first read head and reading a second analog signal from a second read head in the plurality of read heads, wherein amplifying the analog signal comprises amplifying the first analog signal and amplifying the second analog signal, and wherein digitizing the amplified analog signal comprises digitizing the first amplified analog signal to yield first digital samples and digitizing the second amplified analog signal to yield second digital samples.

19. The method of claim 18, wherein calculating the cross-talk comprises:
   convolving the first digital samples with a time-reversed version of the pseudo-random bit sequence to yield first convolution results;
   convolving the second digital samples with the time-reversed version of the pseudo-random bit sequence to yield second convolution results; and
   computing an inverse transfer function based on the first convolution results; and
   convolving the second convolution results with the inverse transfer function.

20. A storage device, comprising:
   a magnetic storage medium operable to store data;
   a head assembly disposed in relation to the storage medium and comprising an array reader with a plurality of read heads to read and write the data on the storage medium;
   a first preamplifier connected to a first read head in the plurality of read heads;
   a second preamplifier connected to a second read head in the plurality of read heads; and
   a cross-talk measurement circuit connected to the first preamplifier and to the second preamplifier, operable to measure cross-talk between a first signal from the first read head and a second signal from the second read head based on the first signal and on the second signal while one of the read heads is driven and a remainder of the plurality of read heads are not driven.

* * * * *